Oct. 18, 1949.  J. STURROCK  2,485,514

SPEED RESPONSIVE VALVE

Filed June 14, 1944

INVENTOR.
James Sturrock
BY
Woodling and Krost
attys.

Patented Oct. 18, 1949

2,485,514

UNITED STATES PATENT OFFICE 2,485,514

SPEED RESPONSIVE VALVE

James Sturrock, Cleveland Heights, Ohio, assignor to The Rotor Tool Company, a corporation of Ohio Application June 14, 1944, Serial No. 540,281

4 Claims. (Cl. 137—140)

1

My invention relates to speed control devices in general, and more particularly to governors using centrifugal responsive controls.

An object of my invention is to provide for dampening of longitudinal relative movements between two governing parts of a rotating speed control governor.

Another object of my invention is to reduce hunting or unwanted oscillations in fluid motor governors and fluid motors which they control.

Another object of my invention is the provision of variable friction rings or shoes that are responsive to the rotative speed of a governor to reduce the responsiveness of the governor to quick-action variations of speed whereby smooth operation is obtained.

Another object of my invention is to reduce the responsiveness of a speed governor to instantaneous variations of speed.

Another object of my invention is the provision of shock absorbing means to dampen the oscillations of a mechanical governor.

Other objects and a fuller understanding of the invention may be had by referring to the following description and claims, taken in conjunction with the accompanying drawing, in which:

2

Figure 1:
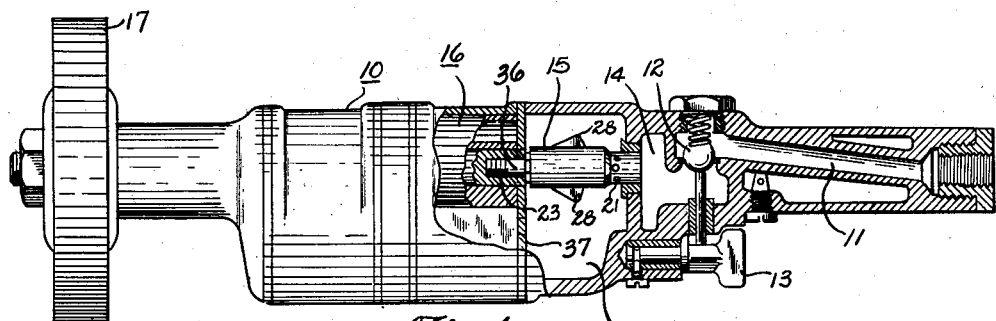
Figure 1 is a perspective view of a type of fluid motor device in which my invention may be used, parts being cut away to show the governor.

With reference to Figure 1 of the drawing, for the purpose of illustration, I show a fluid power grinder 10, having a supply or feed duct 11, a ball valve 12 actuated by a hand control throttle 13, a fluid vestibule 14, my improved governor 15, a fluid motor 16, a partition 37, and a driven member or grinding wheel 17. The governor 15 is mounted in a governor chamber 38 and governs the fluid admitted to the fluid motor.

In operation, the fluid power grinder 10 is driven by a fluid, such as air, under pressure. The fluid enters the grinder through the feed duct 11, is admitted past the ball valve 12 by the hand control throttle 13, whereby the vestibule 14 is filled with the fluid under pressure. The fluid passes through the governor 15 into the governor chamber 38, and then through suitable intake valves in the partition 37 into the motor chamber 16 whereby the fluid pressure drives the fluid motor. The function of the governor is to control the amount of the fluid passing from the vestibule 14 into the fluid motor 16 in a given period of time.

Figure 2:
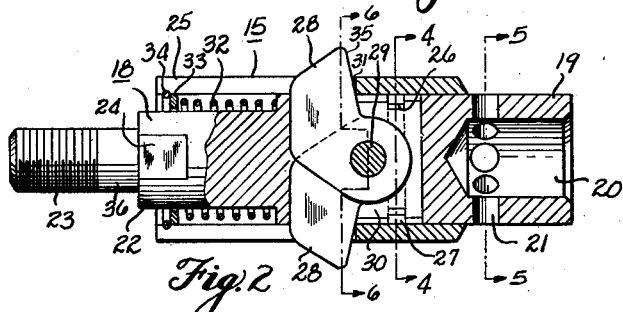
Figure 2 is a longitudinal cross-sectional view of my governor showing the relation of the various parts in a relaxed position as they are when the fluid motor is not in operation.
Figure 6:
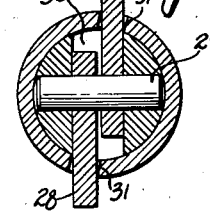
Figure 6 is an end cross-sectional view of the governor taken along the line 6—6 of Figure 2 and showing the mounting pin and the governor weights.
Figure 7:
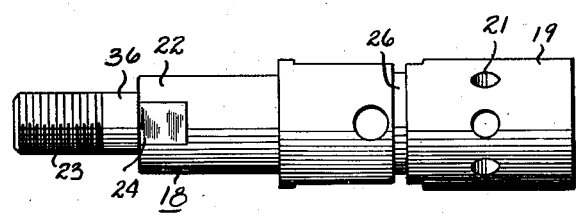
Figure 7 is a perspective side view of the inner part of the governor showing a groove wherein a friction split ring is placed to act as a shock absorber.

To better understand the features of my invention, reference is made to Figure 2 of the drawing in which the governor 15, with which my invention may be employed, is shown in a longitudinal cross-sectional view. The governor 15, as illustrated, comprises an inner part 18, a sleeve part 25, swingably mounted weights 28, a spring 32, and split ring or shoe shock absorbing means 27. The inner part 18 has a projecting wall 19 at the right-hand end thereof forming a cavity 20. Openings 21 are circumferentially located about the cavity 20 and extend through the wall 19 to provide passageways from the cavity 20 into the governor chamber 38. At the end opposite the cavity 20, the inner part 18 has a shank part 22 of reduced cross-sectional area. A threaded part 23 is extended from the shank 22 by a shaft 36. It is noted from the drawing that a grip or flat area 24 is provided on the shank 22 to accommodate a wrench to screw the threaded part 23 into a rotating part of the motor 16. The sleeve part 25 is shown surrounding the inner part 18 and forming a sliding fit therewith. As noted in Figure 2, the two swingably mounted weights 28 are fastened at their inner end by a pin 29 within a slot 30 of the inner part 18. As is illustrated in Figure 6 of the drawing, longitudinal slots 31 are provided in the sleeve part 25 to allow the free ends of the weights 28 to extend therethrough and project from the surface of the governor 15.

The spring 32 is mounted upon the shank portion 22 of the inner member 18 and engages the sleeve part 25 through a washer 33 and a lock ring 34. The spring thus mounted urges the sleeve part 25 longitudinally along the inner part 18 away from the openings 21 therein to return the governor to a relaxed position. It will be noted with reference to Figures 1 and 2 that the openings 21 are completely uncovered when the governor mechanism 15 is in a relaxed position, thereby allowing full flow of fluid from the vestibule 14 into the fluid motor 16 when the ball valve 12 is opened. However, as the fluid motor 16 gains speed and carries the governor mechanism rotatively therealong, centrifugal force causes the swingably mounted weights 28 to swing outwardly about the pins 29. The swinging of the weights 28 outwardly causes an edge 35 of the weights 28 to engage the longitudinal slots 31 of the sleeve part 25 and force the sleeve part 25 longitudinally along the inner part 18 against the action of the spring 32.

As shown in Figure 1, the governor 15 is mounted in the governor chamber 38 with the projecting wall 19 fitting into a bearing carried by the right-hand wall of the governor chamber 38. At the opposite end of the governor, the shaft 36 extends through the partition 37 and the threaded part 23 is screwed into a rotating part of the motor 16. With the governor mounted as thus described, it will rotate at the same speed as the fluid motor.

The governor 15 is used to limit the speed of fluid motor to a predetermined maximum by blanking out the supply openings 21 if the rotating speed tends to become too great. In operation, there is a tendency for the governor to "hunt" and cause irregular operation of the fluid motor.

Figures 4, 5:
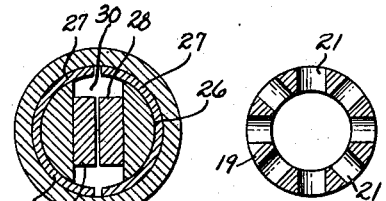
Figure 4 is an end cross-sectional view taken along the line 4—4 of Figure 2 and showing the position of the shock absorbing means or friction rings in relation to the cooperating part of the governor.
Figure 5 is an end cross-sectional view taken along the line 5—5 of Figure 2 and illustrating the openings through which the driving fluid is directed to furnish power to the rotary fluid motor.
Figure 3:
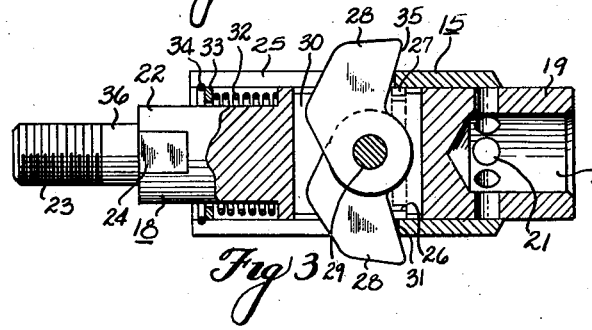
Figure 3 is a cross-sectional view of my governor showing the position of the various parts as they are when the governing weights are in a position of maximum deflection.

My invention is used to dampen the longitudinal hunting of the sleeve part 25 upon the inner part 18 whereby smooth operation is obtained, and comprises a shock-absorbing device as best shown in Figure 4 in the form of a split ring or shoe 27 carried in a recess 26 in the inner part 18.

By inserting the split ring or shoe 27 within the recess on the inner part 18 as hereinbefore described, interlocking surfaces are produced between the ring 27 and the inner part 18 to hold the ring 27 in place. The split ring or shoe 27 is dimensioned to engage the inner surface of the sleeve part 25 and is disposed to exert a pressure against the inner wall of the sleeve under the action of centrifugal force. The pressure between the split ring or shoe 27 and the sleeve part 25 sets up friction and causes a drag between the sleeve member 25 and the inner part 18 with which the split ring or shoe 27 is interconnected, thereby preventing the "hunting" action of the governor.

It is thus seen that the frictional drag between the parts 27 and 25 acts as a shock absorbing means to dampen the hunting oscillations of the part 25 and consequently reduce the irregular operation of the fluid motor 16. It can readily be seen that if the revolutions per minute were plotted against time on a graph, the resulting line of a non-dampening governed device would represent sharp high peaks of intense speed and deep valleys of reduced speed as the fluid motor 16 hunted. However, with the shock absorbing means described which constitutes my invention, the height of the peaks on the chart and the depths of the valleys on the chart are modified to produce a smooth line.

Governor controlled fluid motors operating at high speed have a greater tendency to "hunt" than low speed motors. For example, a motor revolving at 6000 revolutions per minute has a greater tendency to "hunt" than a motor revolving at 4000 revolutions per minute.

My split ring or shoe part 27 is disposed to produce a greater frictional drag between the relatively longitudinally movable parts of the governor 15 at high speed than at low speed. Therefore, it can be seen that my governor is adaptable to motors of any speed and will produce the greatest resistance to "hunting" where it is most needed.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A fluid mechanism governor disposed to rotate about an axis comprising, in combination, an inner member having a circumferential wall extending from one end thereof, the wall forming a fluid cavity, said wall having at least an opening passing therethrough and providing an escape for fluid to pass from the said fluid cavity, a sleeve member surrounding the inner member, said inner member and sleeve being rotatably driven as a unit, means responsive to the rotative speed of the unit to reciprocally move one of said members longitudinally with respect to the other members and blank at least part of the said at least an opening, and reciprocation dampening means between the inner member and the sleeve member to dampen relative longitudinal movement between said members, said dampening means comprising at least a shoe member carried by said inner member and adapted to frictionally contact said sleeve member, said at least a shoe member and said inner member having interlocking means adapted to hold the said at least a shoe member against longitudinal movement relative to said inner member, said at least a shoe member being actuable by centrifugal force to move radially outwardly relative to said inner member and frictionally engage the sleeve member, the degree of frictional engagement of the at least a shoe member against the sleeve increasing in relation to the increase in speed of rotation of said inner member and sleeve member, whereby friction between the said at least a shoe member and the sleeve member will be related to rotative speed of the governor to dampen the longitudinal movement of the sleeve member relative to the inner member.

2. A fluid mechanism governor disposed to rotate about an axis comprising, in combination, an inner member having a circumferential wall extending from one end thereof, the wall forming a fluid cavity, said wall having at least an opening passing therethrough and providing an escape for fluid to pass from the said fluid cavity, a sleeve member surrounding the inner member, said inner member and sleeve being rotatably driven as a unit, means responsive to the rotative speed of the unit to reciprocally move the sleeve member longitudinally with respect to the inner member and blank at least part of the said at least an opening, and reciprocation dampening means between the inner member and the sleeve member to dampen relative longitudinal movement between said members, said dampening means comprising at least a shoe member carried by said inner member and adapted to frictionally contact said sleeve member, said at least a shoe member and said inner member having interlocking means adapted to hold the said at least a shoe member against longitudinal movement relative to said inner member, said at least a shoe member being actuable by centrifugal force to move radially outwardly relative to said inner member and frictionally engage the sleeve member, the degree of frictional engagement of the at least a shoe member against the sleeve increasing in relation to the increase in speed of rotation of said inner member and sleeve member, whereby friction between the said at least a shoe member and the sleeve member will be related to rotative speed of the governor to dampen the longitudinal movement of the sleeve member relative to the inner member.

3. A governor disposed to rotate about an axis, comprising, in combination, an inner member, a sleeve member surrounding the inner member, said inner member and sleeve being rotatably driven as a unit, means responsive to the rotative speed of the unit to reciprocably move one of said members longitudinally with respect to the other member and perform governing action, and reciprocating dampening means between the inner member and the sleeve member to dampen relative longitudinal movement between said members, said dampening means comprising at least a shoe member carried by said inner member and adapted to frictionally contact said sleeve member, said at least a shoe member and said inner member having interlocking means adapted to hold said at least a shoe member against longitudinal movement relative to said inner member, said at least a shoe member being actuable by centrifugal force to move radially outwardly relative to said inner member and frictionally engage the sleeve member, the degree of frictional engagement of the at least a shoe member against the sleeve increasing in relation to the increase in speed of rotation of said inner member and sleeve member, whereby friction between the said at least a shoe member and the sleeve member will be related to rotative speed of the governor to dampen the longitudinal movement of the sleeve member relative to the inner member.

4. A governor disposed to rotate about an axis, comprising, in combination, an inner member, a sleeve member surrounding the inner member, said inner member and sleeve being rotatively driven as a unit, means responsive to the rotative speed of the unit to reciprocably move one of said members longitudinally with respect to the other member and perform governing action, and reciprocating dampening means between the inner member and the sleeve member to dampen relative longitudinal movement between said members, said dampening means comprising at least a shoe member, said inner member having a recess in the surface, said at least a shoe member being disposed within said recess to hold the said at least a shoe member against longitudinal movement relative to said inner member, said at least a shoe member being actuable by centrifugal force to move radially outwardly in said recess relative to said inner member and frictionally engage the sleeve member, the degree of frictional engagement of the at least a shoe member against the sleeve increasing in relation to the increase in speed of rotation of said inner member and sleeve member, whereby friction between the said at least a shoe member and the sleeve member will be related to rotative speed of the governor to dampen the longitudinal movement of the sleeve member relative to the inner member.

JAMES STURROCK.

REFERENCES CITED

The following references are of record in the file of this patent:

UNITED STATES PATENTS

| Number | Name | Date |
|---|---|---|
| 1,127,012 | Kagi | Feb. 2, 1915 |
| 1,698,299 | Dickinson | Jan. 8, 1929 |
| 1,747,468 | Cowardin | Feb. 18, 1930 |
| 2,093,671 | Giffen | Sept. 21, 1937 |
| 2,119,473 | Smith | May 31, 1938 |
| 2,343,146 | Jenkins | Feb. 29, 1944 |